(12) United States Patent
Sumisaki et al.

(10) Patent No.: US 8,970,117 B2
(45) Date of Patent: Mar. 3, 2015

(54) LIGHT EMITTING ELEMENT DRIVE DEVICE AND MOBILE APPARATUS

(75) Inventors: Katsushi Sumisaki, Osaka (JP); Toshihiko Taniguchi, Nara (JP); Tsunemi Yoshino, Nara (JP); Satoshi Amari, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 220 days.

(21) Appl. No.: 13/518,044

(22) PCT Filed: Jan. 31, 2011

(86) PCT No.: PCT/JP2011/000505
§ 371 (c)(1),
(2), (4) Date: Jun. 21, 2012

(87) PCT Pub. No.: WO2011/093107
PCT Pub. Date: Aug. 4, 2011

(65) Prior Publication Data
US 2012/0262073 A1 Oct. 18, 2012

(30) Foreign Application Priority Data

Feb. 1, 2010 (JP) .................. 2010-020064
Mar. 26, 2010 (JP) .................. 2010-072033

(51) Int. Cl.
*H05B 37/02* (2006.01)
*G03B 15/05* (2006.01)
(Continued)

(52) U.S. Cl.
CPC ............ *G03B 15/05* (2013.01); *G03B 15/0447* (2013.01); *H04N 5/23241* (2013.01); *H05B 33/0818* (2013.01); *H04M 1/22* (2013.01); *Y02B 20/346* (2013.01)
USPC ............ 315/159; 315/291; 315/224; 315/340; 307/109

(58) Field of Classification Search
CPC ........................................ H05B 37/02

USPC ............ 315/250, 291, 224, 159, 240; 320/167
See application file for complete search history.

(56) References Cited

U.S. PATENT DOCUMENTS 7,043,156 B2 * 5/2006 Tsuchida et al. .............. 396/164
7,391,406 B2 * 6/2008 Yamamoto et al. ........... 345/102
(Continued)

FOREIGN PATENT DOCUMENTS

| CN | 1661917 A | 8/2005 |
|---|---|---|
| JP | 11-237667 A | 8/1999 |

(Continued)

OTHER PUBLICATIONS

International Search Report for PCT/JP2011/000505, Mar. 15, 2011.
(Continued)

*Primary Examiner* — Douglas W Owens
*Assistant Examiner* — Wei Chan
(74) *Attorney, Agent, or Firm* — RatnerPrestia

(57) ABSTRACT

A light emitting element drive device of the present invention includes a light emitting element; a drive unit for driving the light emitting element; an electricity storage element capable of storing electric power; a battery power supply capable of supplying electric power to the electricity storage element; and a boost chopper circuit having an inductor, for boosting voltage by opening and closing a switching element. The drive unit is switchable between three states: a storing state in which electric power from the battery power supply is stored in the electricity storage element; a first discharging state in which the electric power stored in the electricity storage element is supplied to the light emitting element; and a second discharging state in which electric power from the battery power supply is boosted by the boost chopper circuit and is supplied to the light emitting element.

11 Claims, 14 Drawing Sheets

(51) Int. Cl.
*F21K 5/06* (2006.01)
*H04N 5/232* (2006.01)
*H05B 33/08* (2006.01)
*H04M 1/22* (2006.01)

(56) References Cited

U.S. PATENT DOCUMENTS

| | | |
|---|---|---|
| 7,619,368 B2* | 11/2009 | Lu ............................ 315/209 R |
| 8,004,213 B2* | 8/2011 | Imanaka ....................... 315/307 |
| 2004/0057715 A1* | 3/2004 | Tsuchida et al. ............. 396/155 |
| 2005/0135797 A1* | 6/2005 | Tsuchida et al. ............... 396/52 |
| 2005/0202851 A1 | 9/2005 | Yamamoto et al. |
| 2005/0259983 A1* | 11/2005 | Tsuchida et al. ............. 396/205 |
| 2005/0271376 A1* | 12/2005 | Tsuchida et al. ............. 396/205 |
| 2006/0055341 A1* | 3/2006 | Watanabe et al. ............ 315/291 |
| 2007/0210724 A1* | 9/2007 | Unkrich et al. ........... 315/209 R |
| 2008/0129219 A1* | 6/2008 | Smith et al. .................. 315/291 |
| 2008/0203946 A1* | 8/2008 | Ito et al. ....................... 315/307 |
| 2009/0085502 A1* | 4/2009 | Geris et al. ................... 315/308 |
| 2009/0096382 A1* | 4/2009 | Yamamoto et al. ........... 315/250 |
| 2009/0160367 A1* | 6/2009 | Imanaka ....................... 315/307 |
| 2009/0167187 A1* | 7/2009 | Kitagawa et al. ............... 315/77 |
| 2010/0060178 A1* | 3/2010 | Drader et al. ............... 315/200 A |
| 2010/0213842 A1* | 8/2010 | Geris ............................. 315/33 |
| 2010/0225235 A1 | 9/2010 | Nagase |
| 2010/0295379 A1* | 11/2010 | Garcia ........................... 307/109 |
| 2010/0327776 A1* | 12/2010 | Yufuku et al. ................ 315/307 |
| 2013/0154508 A1* | 6/2013 | Gilliom ........................ 315/297 |
| 2013/0257277 A1* | 10/2013 | Zudrell-Koch et al. ....... 315/112 |
| 2014/0077717 A1* | 3/2014 | Otake et al. .................. 315/224 |

FOREIGN PATENT DOCUMENTS

| | | |
|---|---|---|
| JP | 2000-111791 A | 4/2000 |
| JP | 2001-209893 A | 8/2001 |
| JP | 2002-258363 A | 9/2002 |
| JP | 2004-29558 A | 1/2004 |
| JP | 2007-108545 A | 4/2007 |
| JP | 2008-145772 A | 6/2008 |
| JP | 2009-111035 A | 5/2009 |

OTHER PUBLICATIONS

CN Search Report for 201180007482.8, Jul. 21, 2014.

* cited by examiner

US 8,970,117 B2

LIGHT EMITTING ELEMENT DRIVE DEVICE AND MOBILE APPARATUS

TECHNICAL FIELD

The present invention relates to a light emitting element drive device including a light emitting element, a drive unit for driving the light emitting element, an electricity storage element capable of storing electric power, and a battery power supply capable of supplying electric power to the drive unit and the electricity storage element; and to a mobile apparatus including the drive device.

BACKGROUND ART

As shown in FIG. 13, conventional light emitting element drive device 1d is known including light emitting element 2, drive unit 3 for driving light emitting element 2, electricity storage element 4 capable of storing electric power, battery power supply 6 capable of supplying electric power to electricity storage element 4, and boost chopper circuit 9 having inductor 91, for boosting voltage by opening and closing switching element 92. Boost chopper circuit 9 includes diode 93.

Light emitting element drive device 1d further includes camera unit 7 capable of imaging, control unit 8 for controlling the entire device, and limiting resistor 44 for limiting a current flowing through light emitting element 2. Control unit 8 includes drive control unit 81 for controlling drive unit 3 and chopper control unit 82 for controlling boost chopper circuit 9.

Drive unit 3, with first and second switch units (CMOS) 12 and 13 provided, is switchable between two states: a state (hereinafter also referred to as a storing state) in which electric power from battery power supply 6 is boosted by boost chopper circuit 9 and is stored in electricity storage element 4; and a state (hereinafter also referred to as a discharging state) in which the electric power stored in electricity storage element 4 is supplied to light emitting element 2 (refer to patent literature 1 for example). The following describes the storing state and the discharging state.

In the storing state, drive control unit 81 outputs an H signal to first CMOS 12 to cause the H signal to be applied to the input of the gate of first CMOS 12, which is thus turned on (close). Meanwhile, drive control unit 81 outputs an L signal to second CMOS 13 to cause the L signal to be applied to the input of the gate of second CMOS 13, which is thus turned off (open).

Consequently, current i1 flows from battery power supply 6 through the closed loop of first CMOS 12, inductor 91, diode 93, and electricity storage element 4, causing electricity storage element 4 to store electric power supplied from battery power supply 6. At this moment, chopper control unit 82 opens and closes switching element 92 rapidly and periodically, which boosts electric power (voltage) from battery power supply 6 and stores electric power in electricity storage element 4.

In the discharging state, drive control unit 81 outputs an L signal to first CMOS 12 to cause the L signal to be applied to the input of the gate of first CMOS 12, which is thus turned off (open). Meanwhile, drive control unit 81 outputs an H signal to second CMOS 13 to cause the H signal to be applied to the input of the gate of second CMOS 13, which is thus turned on (close).

Consequently, current i2 flows through the closed loop of electricity storage element 4, limiting resistor 44, light emitting element 2, and second CMOS 13, causing electricity storage element 4 to supply electric power to light emitting element 2, which thus light emitting element 2 emits light.

In the meantime, in order that light emitting element drive device 1d shown in FIG. 13 causes light emitting element 2 to emit light again, electricity storage element 4 that has discharged needs to store electric power again. Thus, in a case where short-interval (continuous) light emission (i.e. imaging) is required, electricity storage element 4 fails to store electric power within an appropriate time, which disables imaging at desired timing.

Further, as shown in FIG. 14, light emitting element drive device 1e is known including light emitting element 2; drive unit 3 for driving light emitting element 2; first and second electricity storage elements 4 and 5 capable of storing electric power; and battery power supply 6 capable of supplying electric power to drive unit 3 and each electricity storage elements 4 and 5. Light emitting element drive device 1e further includes camera unit 7 capable of imaging; control unit 8 for controlling the entire device; boost unit 9 for boosting electric power supplied from battery power supply 6; and balancing resistors 10 for evenly storing electric power in series-connected each electricity storage elements 4 and 5.

In light emitting element drive device 1e, with inverter (NOT gate) 11 and first and second switch units (CMOS) 12 and 13 provided, drive unit 3 is switchable between two states: a storing state in which each electricity storage elements 4 and 5 store electric power from battery power supply 6; and a discharging state in which the electric power stored in each electricity storage elements 4 and 5 is supplied to light emitting element 2 (refer to patent literature 1 for example). The following describes the storing state and discharging state.

In the storing state, when drive control unit 8 outputs an L signal, the L signal is applied to the input of inverter 11, and thus an H signal is applied to the input of the gate of first CMOS 12, which is thus turned on (close). Meanwhile, the L signal is applied to the input of the gate of second CMOS 13, which is thus turned off (open). Consequently, current i1 flows from battery power supply 6 through the closed loop of first CMOS 12, boost unit 9, and each electricity storage elements 4 and 5, which causes each electricity storage elements 4 and 5 to store electric power supplied from battery power supply 6.

In the discharging state, when drive control unit 8 outputs an H signal to activate the circuit, the H signal is applied to the input of inverter 11, and thus an L signal is applied to the input of the gate of first CMOS 12, which is thus turned off (open). Meanwhile, the H signal is applied to the input of the gate of second CMOS 13, which is thus turned on (close). Consequently, current i2 flows through the closed loop of electricity storage elements 4 and 5, light emitting element 2, and second CMOS 13 to cause each electricity storage elements 4 and 5 to supply electric power to light emitting element 2, which thus light emitting element 2 emits light.

In the meantime, with light emitting element drive device 1e shown in FIG. 14, battery power supply 6 can supply electric power with a voltage of 3.6 V; each electricity storage elements 4 and 5, 2.5 V, for example; however, light emitting element 2 requires 4.0 V for emitting light, which is higher than those voltages. Hence, boost unit 9 is provided and two electricity storage elements 4 and 5 are serially connected.

Concretely, in the storing state, boost unit 9 boosts a voltage of 3.6 V supplied from battery power supply 6 to 5.0 V to allow two electricity storage elements 4 and 5 to store electric power to an added voltage value of 5.0 V. In the discharging state, two electricity storage elements 4 and 5 discharge electric power with an added voltage value of 5.0 V, which allows supplying electric power with a voltage higher than that supplied from battery power supply 6 or a single electricity storage element 4 (or 5) to light emitting element 2, which thus light emitting element 2 emits light.

However, to cause light emitting element 2 to emit light again, two electricity storage elements 4 and 5 that have discharged need to store electric power again. Thus, in a case where short-interval (continuous) light emission (i.e. imaging) is required, each electricity storage elements 4 and 5 fail to store electric power within an appropriate time, which disables imaging at desired timing.

CITATION LIST

Patent Literature

PTL 1 Japanese Patent Unexamined Publication No. 2007-108545

SUMMARY OF THE INVENTION

A light emitting element drive device according to the present invention includes a light emitting element; a drive unit for driving the light emitting element; an electricity storage element capable of storing electric power; a battery power supply capable of supplying electric power to the electricity storage element; and a boost chopper circuit having an inductor, for boosting voltage by opening and closing a switching element. The drive unit is switchable between three states: a storing state in which the electricity storage element stores electric power from the battery power supply; a first discharging state in which the electric power stored in the electricity storage element is supplied to the light emitting element; and a second discharging state in which electric power from the battery power supply is boosted by the boost chopper circuit and is supplied to the light emitting element.

With such a configuration, the drive unit switches to the storing state to allow the electricity storage element to store electric power from the battery power supply. Then, the drive unit switches to the first discharging state to allow the electric power stored in the electricity storage element to be supplied to the light emitting element, which thus light emitting element emits light. Further, the drive unit switches to the second discharging state to allow the boost chopper circuit to boost electric power from the battery power supply for supplying to the light emitting element. Consequently, the light emitting element can emit light even in a state where the electricity storage element has completely discharged.

Another light emitting element drive device according to the present invention includes a light emitting element; a drive unit for driving the light emitting element; first and second electricity storage elements capable of storing electric power; a battery power supply capable of supplying electric power to the drive unit and the electricity storage elements; and a control unit power-supplied from the battery power supply, for controlling the drive unit. The drive unit is switchable between the following two states. One is a storing state in which the electricity storage elements and the light emitting element are parallel-connected to the battery power supply and in which electric power supplied from the battery power supply is stored in the electricity storage elements. The other is a discharging state in which the first electricity storage element and the light emitting element are series-connected to the battery power supply and in which the electric power stored in the first electricity storage element is supplied to the light emitting element while the electric power stored in the second electricity storage element is supplied to the control unit.

With such a configuration, in the discharging state in which the electric power stored in the first electricity storage element is supplied to the light emitting element, the drive unit series-connects the battery power supply to the first electricity storage element and the light emitting element. Herewith, the added voltage value of electric power suppliable from the battery power supply and the first electricity storage element to the light emitting element can be set higher than a voltage value at which the light emitting element emits light. Hence, discharge of one electricity storage element allows the light emitting element to emit light, which means that one electricity storage element is adequate that stores electric power to cause the light emitting element to emit light again.

Furthermore, in the discharging state, the drive unit causes the electric power stored in the second electricity storage element to be supplied to the control unit. Herewith, the second electricity storage element functions as a backup power supply for the control unit, which allows the control unit to stably control the drive unit and other units even if the battery power supply causes unexpected trouble (e.g. instantaneous voltage drop) in the discharging state.

Yet another light emitting element drive device according to the present invention includes a light emitting element; a drive unit for driving the light emitting element; first and second electricity storage elements capable of storing electric power; and a battery power supply capable of supplying electric power to the drive unit and the electricity storage elements. The drive unit is switchable between the following three states. One is a storing state in which the electricity storage elements and the light emitting element are parallel-connected to the battery power supply and in which electric power supplied from the battery power supply is stored in the electricity storage elements. The next is a first discharging state in which the first electricity storage element and the light emitting element are series-connected to the battery power supply and in which the electric power stored in the first electricity storage element is supplied to the light emitting element. The last is a second discharging state in which the second electricity storage element and the light emitting element are series-connected to the battery power supply and in which the electric power stored in the second electricity storage element is supplied to the light emitting element.

With such a configuration, in the first discharging state in which the electric power stored in the first electricity storage element is supplied to the light emitting element, the drive unit series-connects the battery power supply, the first electricity storage element, and the light emitting element. Herewith, as a result that the added voltage value of electric power suppliable from the battery power supply and the first electricity storage element to the light emitting element is set higher than a voltage at which the light emitting element emits light, discharge of one electricity storage element allows the light emitting element to emit light.

Furthermore, the drive unit series-connects the battery power supply to the second electricity storage element and the light emitting element, which allows the electric power stored in the second electricity storage element that has been disconnected from the battery power supply in the first discharging state to be supplied to the light emitting element. Herewith, storing electric power in each electricity storage element enables the light emitting element to emit light twice continuously.

DESCRIPTION OF EMBODIMENTS

First Exemplary Embodiment

Figure 13:
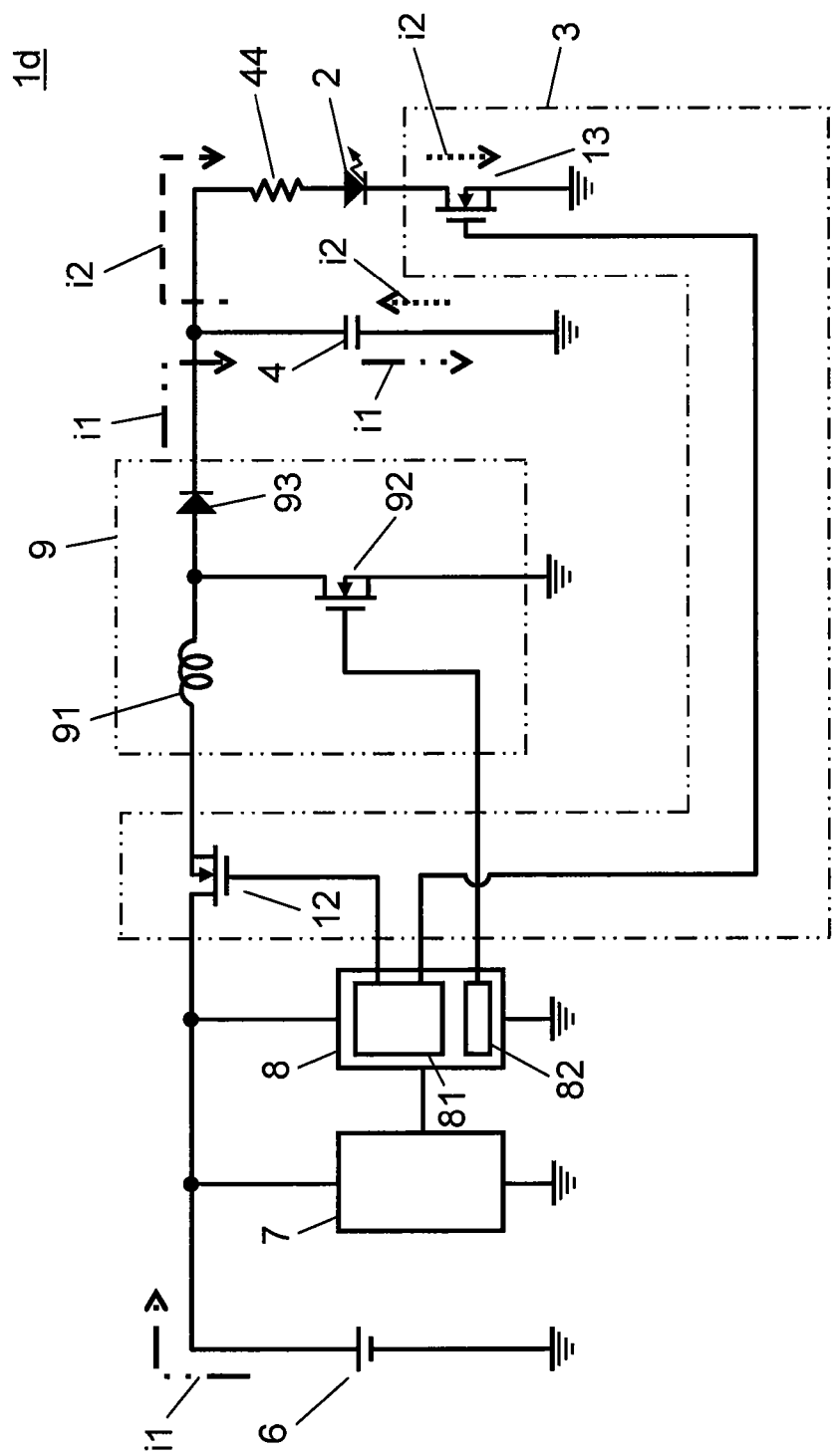
FIG. 13 is a circuit diagram of a conventional light emitting element drive device.

Hereinafter, a description is made of a light emitting element drive device and a mobile apparatus according to a first exemplary embodiment of the present invention in reference to FIGS. 1A through 3. In FIGS. 1A through 3, a component or element with the reference mark same as that of FIG. 13 is the same as that of the conventional technology, unless particularly described.

Figure 1A:
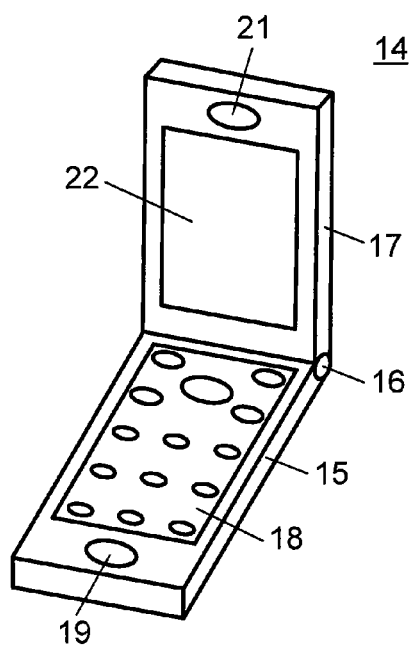
FIG. 1A is a perspective view of the entire mobile apparatus according to an exemplary embodiment of the present invention.
Figure 1B:
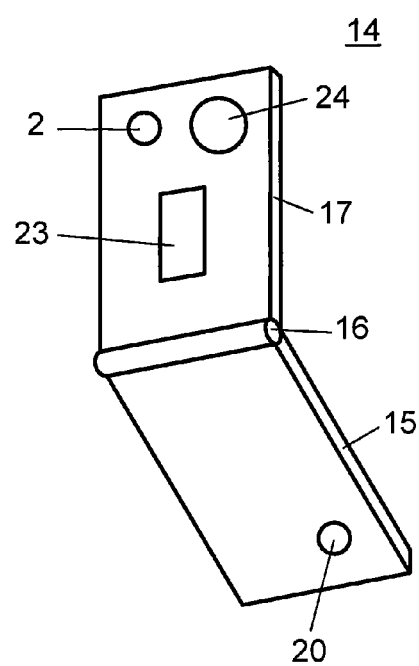
FIG. 1B is a perspective view of the entire mobile apparatus according to the exemplary embodiment of the present invention, viewed from a different direction.
Figure 2:
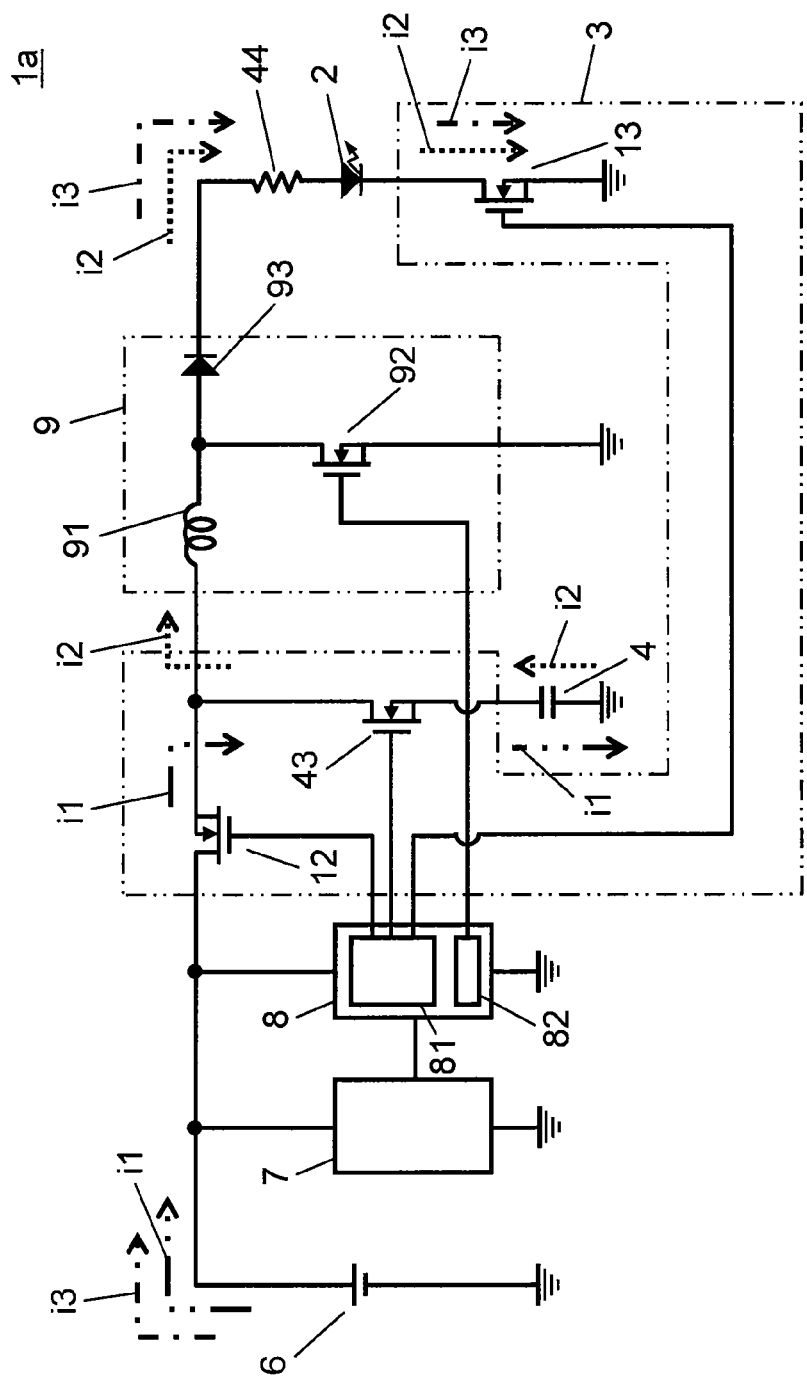
FIG. 2 is a circuit diagram of a light emitting element drive device according to a first exemplary embodiment of the present invention.
Figure 3:
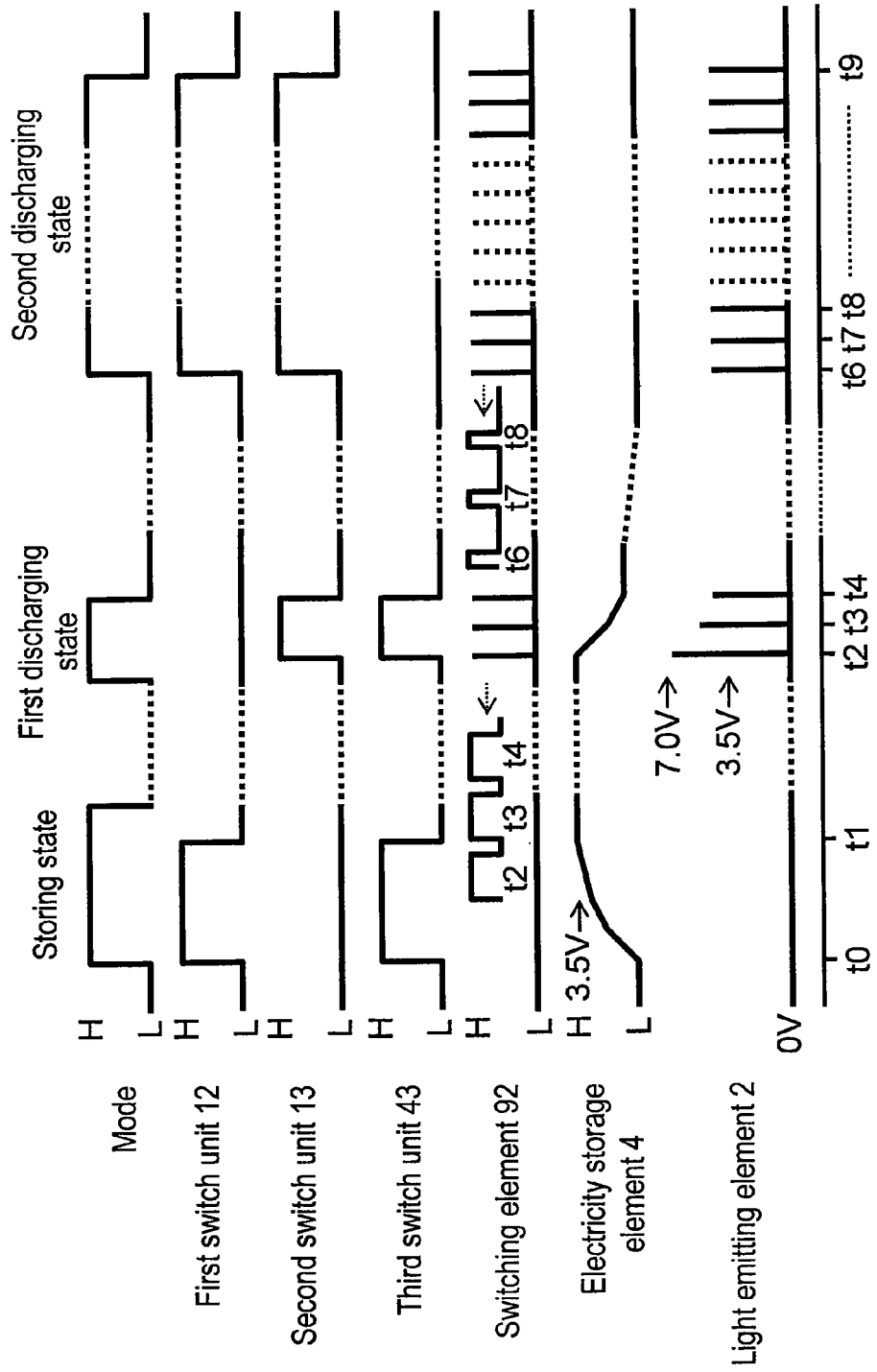
FIG. 3 is an operation waveform chart of each component of the light emitting element drive device according to the first exemplary embodiment of the present invention.

As shown in FIGS. 1A and 1B, mobile apparatus 14 according to the embodiment, with light emitting element drive device 1a provided, is a mobile phone incorporating an LED flash function and a digital camera function. Further, mobile apparatus (hereinafter also referred to as a mobile phone) 14 includes first body 15; and second body 17 foldable first body 15 through hinge mechanism 16.

First body 15 includes operation key unit 18 composed of such as numeric keys, on the inner surface of mobile phone 14 (in a folded state), for receiving input for operating mobile phone 14; and microphone 19 for receiving input of transmission voice. First body 15 further includes sounder 20 for providing notification of such as incoming calls, on the outer surface of mobile phone 14 (in a folded state).

Second body 17 includes speaker 21 for outputting reception voice, on the inner surface of mobile phone 14 (in a folded state); and first display 22 for displaying characters and images. Second body 17 further includes second display 23 for displaying characters and images (similarly to first display 22), on the outer surface of mobile phone 14 (in a folded state); light emitting element 2 for emitting light; and optical system 24 for collecting light (e.g. light from light emitting element 2 or the sun) reflected on a photographic subject.

Light emitting element drive device 1a includes (besides light emitting element 2) drive unit 3 for light emitting element 2; electricity storage element 4 capable of storing electric power; battery power supply 6 capable of supplying electric power to electricity storage element 4; and boost chopper circuit 9 for boosting voltage. Light emitting element drive device 1a further includes camera unit 7 capable of imaging, having an imaging element (not shown) for receiving the light collected by optical system 24; control unit 8 including drive control unit 81 for controlling drive unit 3 and chopper control unit 82 for controlling boost chopper circuit 9; and limiting resistor 44 for limiting a current flowing through light emitting element 2.

In this embodiment, light emitting element 2 is a (white) LED, and drive unit 3 includes first through third switch units (CMOS) 12, 13, and 43. Electricity storage element 4 is an electric double-layer capacitor, and battery power supply 6 is a Li-ion secondary battery. Further, optical system 24 is an object lens movable with respect to the imaging element with an automatic focusing mechanism, and the imaging element is a CMOS or CCD image sensor.

Drive unit 3 is switchable between three states. One is a storing state in which electric power from battery power supply 6 is stored in electricity storage element 4. The next is a first discharging state in which the electric power stored in electricity storage element 4 is boosted by boost chopper circuit 9 and is supplied to light emitting element 2. The last is a second discharging state in which electric power from battery power supply 6 is boosted by boost chopper circuit 9 and is supplied to light emitting element 2. Here, battery power supply 6 and first CMOS 12; and electricity storage element 4 and third CMOS 43 are parallel-connected to boost chopper circuit 9 and light emitting element 2.

Boost chopper circuit 9 includes inductor (also referred to as a choke coil) 91 for storing electric power; switching element 92 for conducting and breaking (switching) a current; and diode 93 for preventing backflow of a current (flowing from light emitting element 2 toward battery power supply 6 and electricity storage element 4). Here, diode 93 and light emitting element 2; and switching element 92 are parallel-connected to inductor 91.

Light emitting element drive device 1a according to this exemplary embodiment is configured as the above. Next, a description is made of operation of light emitting element drive device 1a in reference to FIGS. 2 and 3.

First, in the storing state, drive control unit 81 applies an H signal to the input of the gates of first and third CMOSes 12 and 43, which are thus turned on (close). Meanwhile, drive control unit 81 applies an L signal to the input of the gate of second CMOS 13, which is thus turned off (open). Here, chopper control unit 82 is applying an L signal to switching element 92, which is thus off (open).

Herewith, current i1 flows from battery power supply 6 through the closed loop of first CMOS 12, third CMOS 43, and electricity storage element 4, and thus electricity storage element 4 stores electric power supplied from battery power supply 6. At this moment, the voltage of battery power supply 6 is 3.5 V in this exemplary embodiment, and thus electricity storage element 4 stores electric power to a voltage of 3.5 V.

Next, in the first discharging state, drive control unit 81 applies an H signal to the input of the gates of second and third CMOSes 13 and 43, which are thus turned on (close). Meanwhile, drive control unit 81 applies an L signal to the input of the gate of first CMOS 12, which is thus turned off (open). This causes current i2 to flow through the closed loop of electricity storage element 4, third CMOS 43, boost chopper circuit 9, limiting resistor 44, light emitting element 2, and second CMOS 13, and thus electricity storage element 4 supplies electric power to light emitting element 2.

At this moment, chopper control unit 82 applies H and L signals to switching element 92 rapidly and periodically, which is thus turned on (open) and off (close) rapidly and periodically. Consequently, electric power (voltage) of electricity storage element 4 is boosted and supplied (applied) to light emitting element 2. Concretely, in the initial period in which electricity storage element 4 has stored electric power to a voltage of 3.5 V, a voltage of 7.0 V is applied to light emitting element 2.

In the second discharging state, drive control unit 81 applies an H signal to the input of the gates of first and second CMOSes 12 and 13, which are thus turned on (close). Meanwhile, drive control unit 81 applies an L signal to the input of the gate of third CMOS 43, which is thus turned off (open). This causes current i3 to flow through the closed loop of battery power supply 6, first CMOS 12, boost chopper circuit 9, limiting resistor 44, light emitting element 2, and second CMOS 13, and thus battery power supply 6 supplies electric power to light emitting element 2.

At this moment, chopper control unit 82 applies H and L signals to switching element 92 rapidly and periodically, which is thus turned on (open) and off (close) rapidly and periodically. Consequently, electric power (voltage) from battery power supply 6 is boosted and supplied (applied) to light emitting element 2. Concretely, while voltage of battery power supply 6 is 3.5 V, a voltage of 4.5V is applied to light emitting element 2.

From all of the above, with light emitting element drive device 1a according to this exemplary embodiment, drive unit 3 switches to the storing state to allow electric power from battery power supply 6 to be stored in electricity storage element 4. Then, drive unit 3 switches to the first discharging state to allow the electric power stored in electricity storage element 4 to be boosted by boost chopper circuit 9 and to be supplied to light emitting element 2. Consequently, light emitting element 2 can emit light.

Further, drive unit 3 switches to the second discharging state to allow electric power from battery power supply 6 to be boosted by boost chopper circuit 9 and to be supplied to light emitting element 2. Resultingly, light emitting element 2 can emit light even in a state where electricity storage element 4 has completely discharged. This shortens time during which light emitting element 2 cannot emit light.

Light emitting element drive device 1a according to this exemplary embodiment is not limited to the above-described exemplary embodiment; however, configurations and manners in the following alteration examples may be freely selected and adopted to configurations and manners according to the exemplary embodiment.

Figure 4:
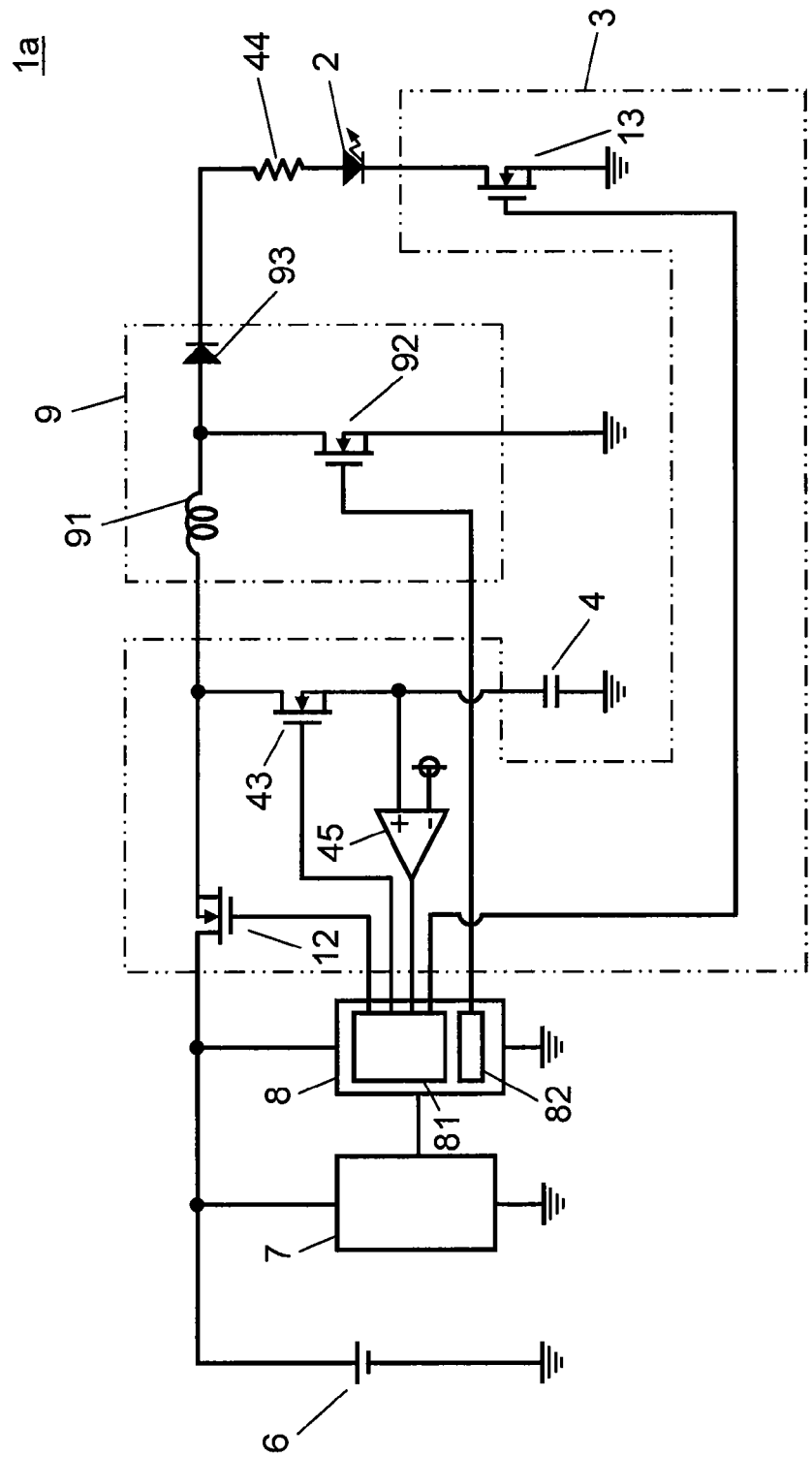
FIG. 4 is a circuit diagram of the light emitting element drive device according to the first exemplary embodiment of the present invention.
Figure 5:
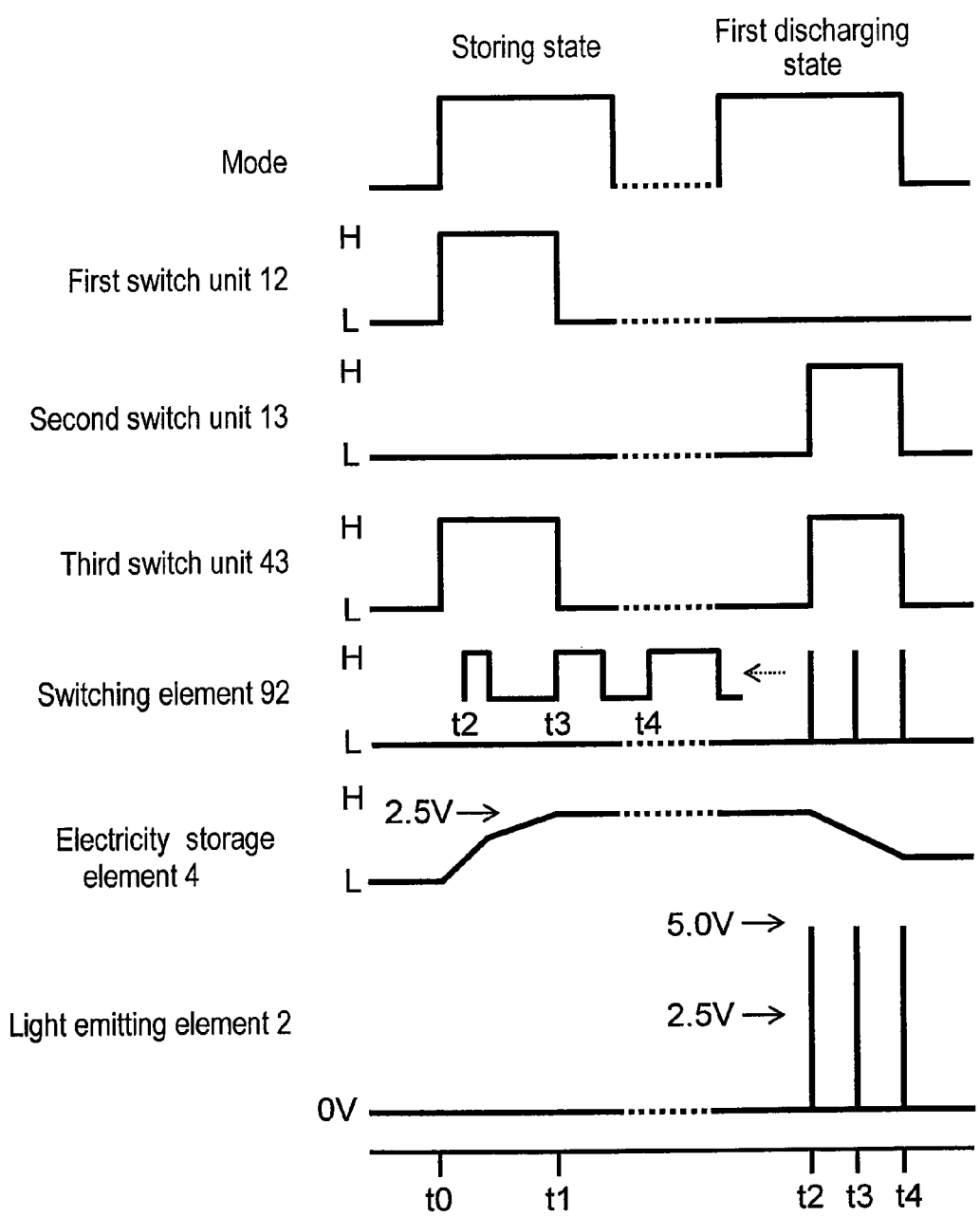
FIG. 5 is an operation waveform chart of each component of the light emitting element drive device according to the first exemplary embodiment of the present invention.

For example, in light emitting element drive device 1a according to the exemplary embodiment, the description is made of the case where electricity storage element 4 stores electric power to the voltage of battery power supply 6, but not limited to the case. As shown in FIGS. 4 and 5, voltage detecting unit 45 for detecting the voltage of electricity storage element 4 may be provided so that electricity storage element 4 stores electric power to a given voltage.

With such a configuration, in the storing state, drive control unit 81 applies an H signal to the input of the gates of first and third CMOSes 12 and 43, which are thus turned on (close). Meanwhile, drive control unit 81 applies an L signal to the input of the gate of second CMOS 13, which is thus turned off (open).

When electricity storage element 4 reaches a given voltage, voltage detecting unit 45 detects this condition and outputs a reach signal to drive control unit 81. Then, drive control unit 81 applies an L signal to the input of the gates of first through third CMOSes 12, 13, and 43, which are thus turned off (open), This causes electricity storage element 4 to store electric power to a given voltage (2.5 V in FIG. 5).

In light emitting element drive device 1a according to this exemplary embodiment, the description is made of the case where switching element 92 of boost chopper circuit 9 opens and closes for a constant time, but not limited to the case. For example, in the first discharging state, as shown in FIG. 5, boost chopper circuit 9 may change opening and closing time of switching element 92.

With such a configuration, in the first discharging state, boost chopper circuit 9 changes opening and closing time of switching element 92, and thus voltage applied to light emitting element 2 can be uniformized in spite of the fact that voltage of electricity storage element 4 drops according to discharge of electricity storage element 4. Concretely, according to a voltage drop due to discharge of electricity storage element 4, on (close) time of switching element 92 is extended.

In light emitting element drive device 1a according to this exemplary embodiment, the description is made of the case where drive unit 3 in the first discharging state causes boost chopper circuit 9 to boost the electric power stored in electricity storage element 4 and to supply the electric power to light emitting element 2, but not limited to the case. For example, drive unit 3 may supply the electric power stored in electricity storage element 4 to light emitting element 2 without boosting it.

In light emitting element drive device 1a according to this exemplary embodiment, the description is made that drive unit 3 turns on (close) first CMOS 12 when storing electric power in electricity storage element 4 in the first discharging state; and in the second discharging state, but not limited to the case. In order for camera unit 7 and control unit 8 not to malfunction caused by a sharp drop of the terminal voltage of battery power supply 6 due to an excessive current flowing from battery power supply 6, a combination of first CMOS 12 and a constant current circuit or a current limit circuit (not shown) for example may turn on (close) and off (open) switching element 92.

Second Exemplary Embodiment

Figure 6:
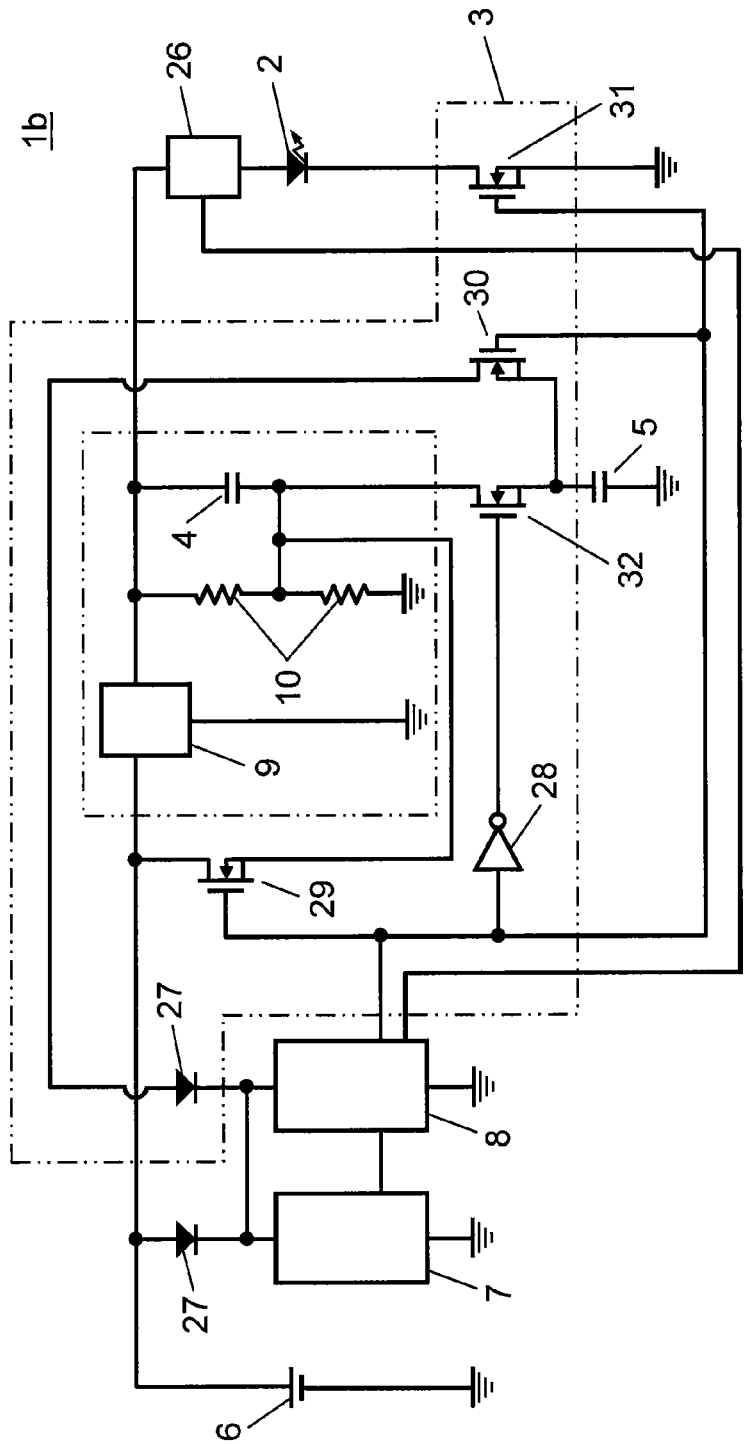
FIG. 6 is a circuit diagram of a light emitting element drive device of a mobile apparatus according to a second exemplary embodiment of the present invention.
Figure 7:
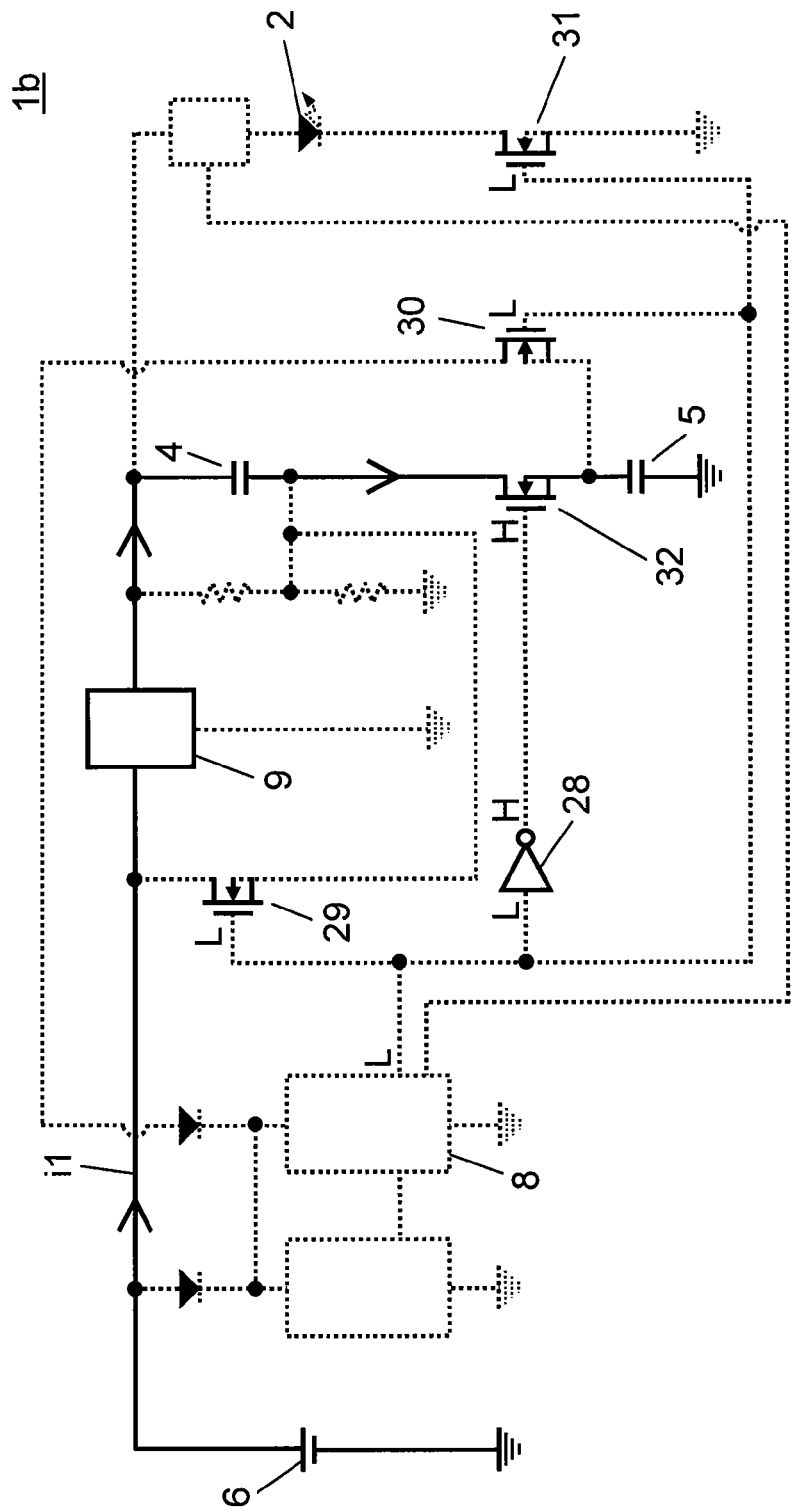
FIG. 7 is a circuit diagram of the light emitting element drive device in the storing state according to the second exemplary embodiment of the present invention.
Figure 8:
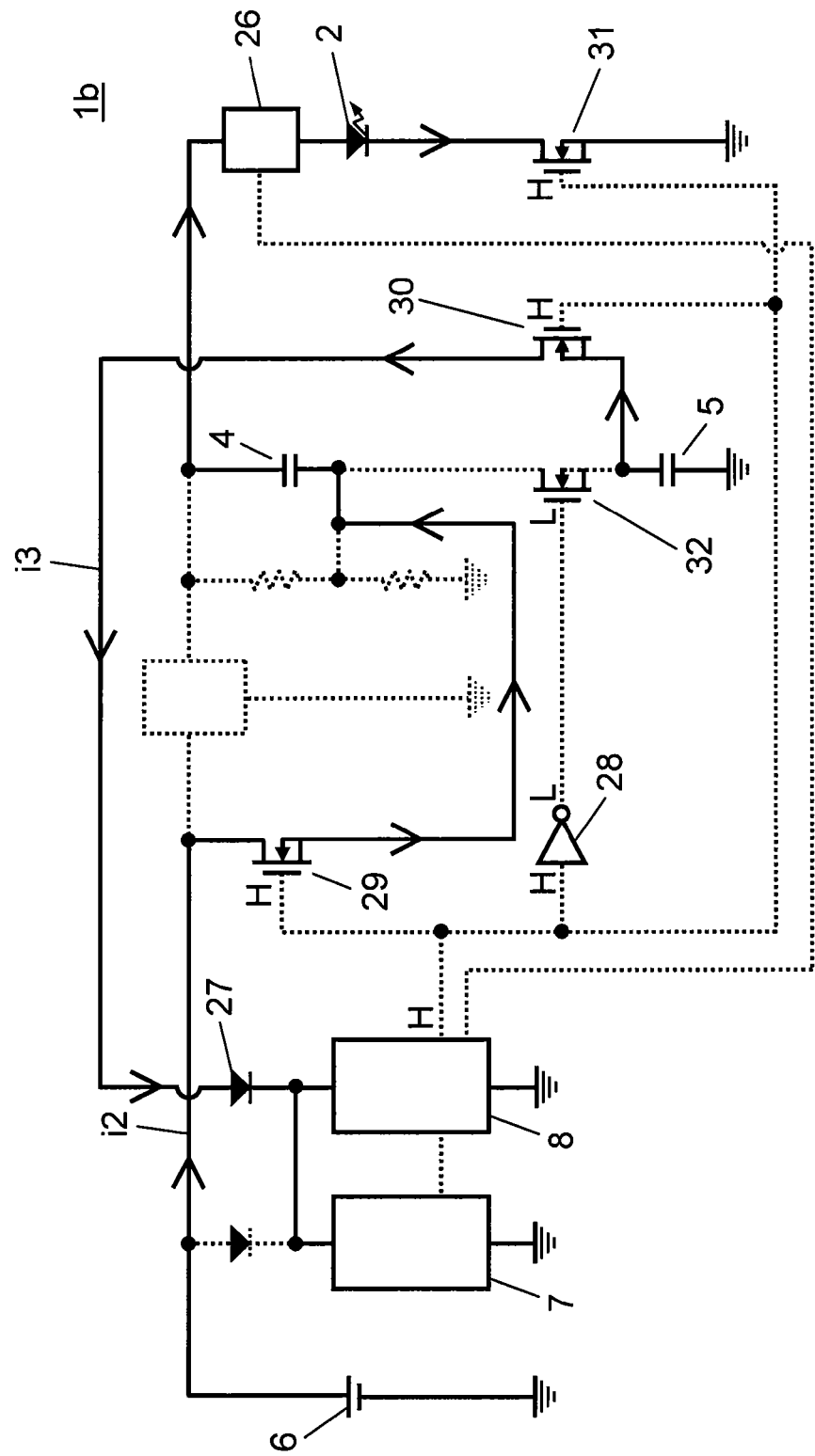
FIG. 8 is a circuit diagram of the light emitting element drive device in the discharging state according to the second exemplary embodiment of the present invention.
Figure 14:
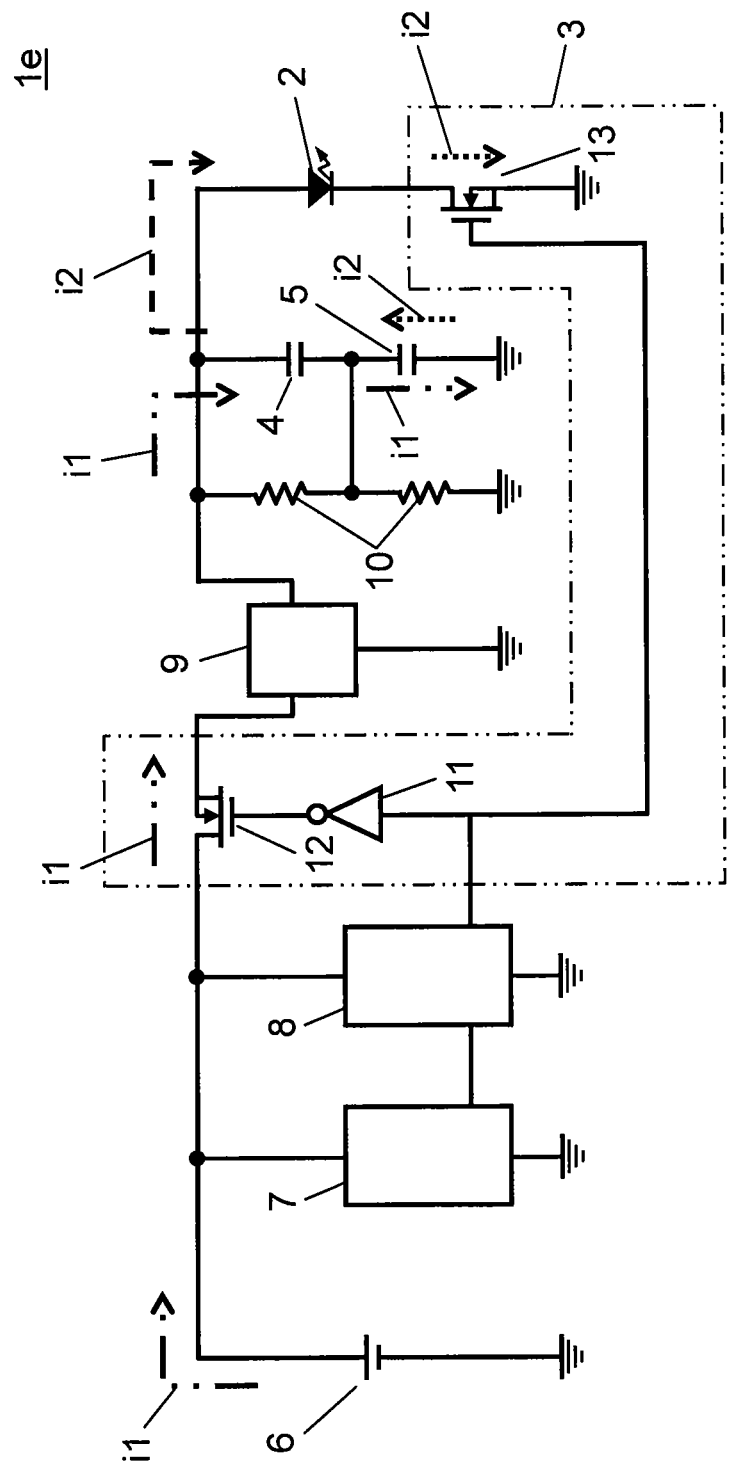
FIG. 14 is a circuit diagram of another conventional light emitting element drive device.

Next, a description is made of a light emitting element drive device according to the second exemplary embodiment of the present invention in reference to FIGS. 6 through 8. In FIGS. 6 through 8, a component or element with the reference mark same as that of FIG. 14 is the same as that of the conventional technology, unless particularly described.

Light emitting element drive device 1b includes (besides light emitting element 2) drive unit 3 for light emitting element 2; first and second electricity storage elements 4 and 5 capable of storing electric power; and battery power supply 6 capable of supplying electric power to drive unit 3 and each electricity storage elements 4 and 5. Light emitting element drive device 1b further includes camera unit 7 capable of imaging, having an imaging element (not shown) for receiving the light collected by optical system 24 (refer to FIG. 1B); and control unit (CPU) 8 for controlling the entire device including drive unit 3.

Light emitting element drive device 1b further includes constant current circuit 26 for regulating a current flowing through light emitting element 2 to a set value. Light emitting element drive device 1b is provided with diodes 27 as required. Here, battery power supply 6 supplies electric power to camera unit 7 and control unit 8 as well.

In this exemplary embodiment, light emitting element 2 is a (white) LED, and drive unit 3 includes first through fourth switch units (CMOS) 29 through 32. Each electricity storage elements 4 and 5 is electric double-layer capacitors, and battery power supply 6 is a Li-ion secondary battery. Further, optical system 24, including an automatic focusing mechanism, is an object lens movable with respect to the imaging element, and the imaging element is a CMOS or CCD image sensor.

Drive unit 3 is switchable between two states. One is a storing state in which electric power from battery power supply 6 is stored in each electricity storage elements 4 and 5. The other is a discharging state in which the electric power stored in each electricity storage elements 4 and 5 is discharged. Drive unit 3 parallel-connects each electricity storage elements 4 and 5 and light emitting element 2 to battery power supply 6.

In the discharging state, drive unit 3 series-connects battery power supply, first electricity storage element 4, and light emitting element 2 (i.e. series-connects first electricity storage element 4 and light emitting element 2 to battery power supply 6) to cause the electric power stored in first electricity storage element 4 to be supplied to light emitting element 2, while causing the electric power stored in second electricity storage element 5 to be supplied to camera unit 7 and control unit 8.

Light emitting element drive device 1b according to this exemplary embodiment is configured as above. A mobile apparatus incorporating light emitting element drive device 1b is configured in the same way as mobile phone 14 described in the first exemplary embodiment, and thus its description is omitted. Next, a description is made of operation of light emitting element drive device 1b according to this exemplary embodiment in reference to FIGS. 7 and 8.

First, in the storing state, as shown in FIG. 7, when control unit 8 outputs an L signal, it is applied to the input of the gates of first through third CMOSes 29 through 31, which are thus turned off (open). Meanwhile, the L signal is applied to the input of inverter 28 to cause an H signal to be applied to the input of the gate of fourth CMOS 32, which is thus turned on (close).

Consequently, current i1 flows from battery power supply 6 through the closed loop (shown by the heavy solid line in FIG. 7) of boost unit 9, first electricity storage element 4, fourth CMOS 32, and second electricity storage element 5, which causes each electricity storage elements 4 and 5 to store electric power supplied from battery power supply 6. At this moment, each electricity storage elements 4 and 5 and light emitting element 2 are parallel-connected to battery power supply 6, and thus voltage is applied to light emitting element 2 as well; however, light emitting element 2 does not emit light since third CMOS 31 is off (open).

In the discharging state, as shown in FIG. 8, when control unit 8 outputs an H signal to activate the circuit, the H signal is applied to the input of the gates of first through third CMOS 29 through 31, which are thus turned on (close). Meanwhile, the H signal is applied to the input of inverter 28 to cause an L signal to be applied to the input of the gate of fourth CMOS 32, which is thus turned off (open).

Consequently, current i2 first flows from battery power supply 6 through the closed loop (shown in by the heavy solid line in FIG. 8) of first CMOS 29, first electricity storage element 4, constant current circuit 26, light emitting element 2, and third CMOS 31, and thus battery power supply 6 and first electricity storage element 4 supply electric power to light emitting element 2. At this moment, the sum of voltage values of electric power supplied from battery power supply 6 and electric power discharged from first electricity storage element 4 is higher than the voltage value of electric power with which light emitting element 2 emits light.

Hence, a voltage high enough to emit light is applied to light emitting element 2, and thus a current at a given level set to constant current circuit 26 flows through light emitting element 2, which thus light emitting element 2 emits light. Here, light emitting element 2 continues emitting light until the sum of voltage values of battery power supply 6 and first electricity storage element 4 becomes lower than the voltage value at which light emitting element 2 emits light, or until control unit 8 outputs an L signal to break current i2 flowing through light emitting element 2.

Meanwhile, current i3 flows from second electricity storage element 5 through the closed loop (shown in by the heavy solid line in FIG. 8) of second CMOS 30, diode 27, and control unit 8 (and camera unit 7), and thus second electricity storage element 5 supplies electric power to control unit 8 and camera unit 7. At this moment, battery power supply 6 as well supplies electric power to control unit 8 and camera unit 7, and thus second electricity storage element 5 functions as a backup electric power supply for control unit 8 and camera unit 7.

From all of the above, with light emitting element drive device 1b and mobile apparatus 14 according to this exemplary embodiment, drive unit 3 series-connects battery power supply 6, first electricity storage element 4, and light emitting element 2 in the discharging state to supply the electric power stored in first electricity storage element 4 to light emitting element 2. Herewith, when setting is made so that the sum of voltage values of electric power supplied from battery power supply 6 and first electricity storage element 4 to light emitting element 2 is higher than the voltage value at which light emitting element 2 emits light, light emitting element 2 can emit light only with discharge of first electricity storage element 4.

Hence, to cause light emitting element 2 to emit light again, storing only electric power that each electricity storage elements 4 and 5 has consumed is adequate. Concretely, if second electricity storage element 5 has not consumed electric power, storing only electric power that electricity storage element 4 (i.e. a single element) has consumed is adequate. This shortens time during which light emitting element 2 cannot emit light.

With light emitting element drive device 1b and mobile apparatus 14 according to this exemplary embodiment, second electricity storage element 5, in the discharging state, is disconnected from battery power supply 6, first electricity storage element 4, and light emitting element 2 to supply the electric power stored in second electricity storage element 5 to control unit 8 and camera unit 7. Herewith, second electricity storage element 5 functions as a backup electric power supply for control unit 8 and camera unit 7, which allows control unit 8 and camera unit 7 to stably operate even if battery power supply 6 causes unexpected trouble (e.g. instantaneous voltage drop) in the discharging state.

Third Exemplary Embodiment

Next, a description is made of a light emitting element drive device according to the third exemplary embodiment of the present invention in reference to FIGS. 9 through 12. In FIGS. 9 through 12, a component or element with the reference mark same as that of FIGS. 6 to 8 is the same as that of the second exemplary embodiment, unless particularly described. A mobile apparatus incorporating light emitting element drive device 1c is configured in the same way as mobile phone 14 described in the first exemplary embodiment, and thus its description is omitted.

Figure 9:
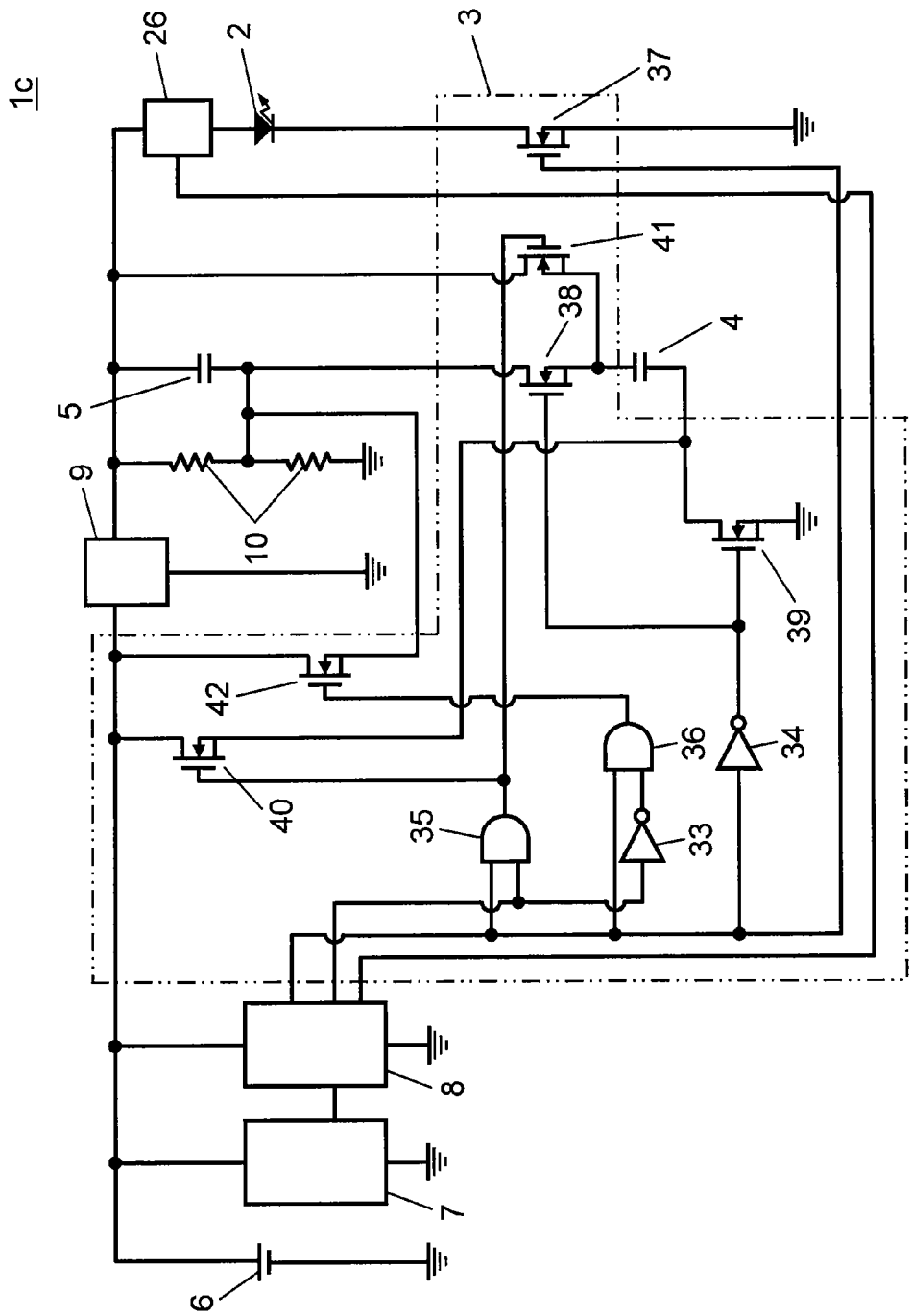
FIG. 9 is a circuit diagram of a light emitting element drive device according to a third exemplary embodiment of the present invention.

As shown in FIG. 9, light emitting element drive device 1c according to this exemplary embodiment is different from light emitting element drive device 1b according to the second exemplary embodiment in the configuration of drive unit 3. In this exemplary embodiment, drive unit 3 includes first and second inverters (NOT gate) 33 and 34, first and second AND gates 35 and 36, and first through sixth switch units (CMOS) 37 through 42.

Drive unit 3 is switchable between three states. One is a storing state in which electric power from battery power supply 6 is stored in each electricity storage elements 4 and 5. The next is a first discharging state in which the electric power stored in first electricity storage element 4 is discharged. The last is a second discharging state in which the electric power stored in second electricity storage element 5 is discharged. In the first discharging state, light emitting element 2 emits light as auxiliary light for automatic focusing. In the second discharging state, light emitting element 2 emits light as flash light for imaging. In the storing state, drive unit 3 parallel-connects each electricity storage elements 4 and 5 and light emitting element 2 to battery power supply 6.

In the first discharging state, drive unit 3 series-connects battery power supply 6, first electricity storage element 4, and light emitting element 2 to cause the electric power stored in first electricity storage element 4 to be supplied to light emitting element 2. Further, in the second discharging state, drive unit 3 series-connects battery power supply 6, second electricity storage element 5, and light emitting element 2 to cause the electric power stored in second electricity storage element 5 to be supplied to light emitting element 2.

Light emitting element drive device 1c according to this exemplary embodiment is configured as the above. Next, a description is made of operation of light emitting element drive device 1c in reference to FIGS. 10 through 12.

Figure 10:
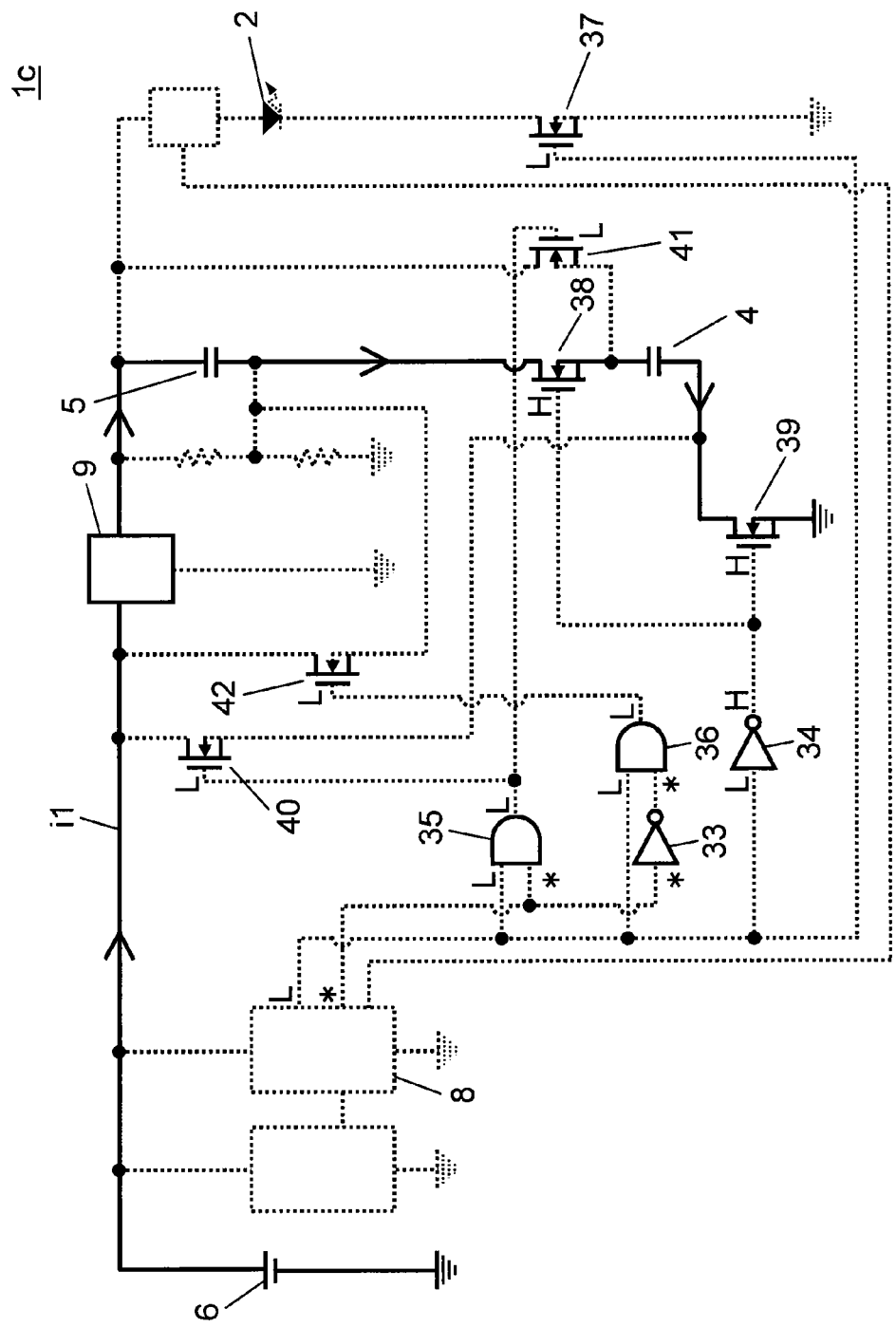
FIG. 10 is a circuit diagram of the light emitting element drive device in the storing state according to the third exemplary embodiment of the present invention.

First in the storing state, as shown in FIG. 10, when control unit 8 outputs an L signal as a first signal, the L signal is applied to the input of the gate of first CMOS 37, which is thus turned off (open). Meanwhile, the L signal is applied to the input of second inverter 34 to cause an H signal to be applied to the input of the gates of second and third CMOSes 38 and 39, which are thus turned on (close).

Meanwhile, the L signal is applied to the first input of first and second AND gates 35 and 36, which thus output an L signal regardless of the second input (a second signal output from control unit 8). Herewith, the L signal is applied to the input of the gates of fourth through sixth CMOSes 40 through 42, which are thus turned off (open).

Hence, current i1 flows from battery power supply 6 through the closed loop (shown by the heavy solid line in FIG. 10) of boost unit 9, second electricity storage element 5, second CMOS 38, first electricity storage element 4, and third CMOS 39, which causes each electricity storage elements 4 and 5 to store electric power supplied from battery power supply 6. At this moment, each electricity storage elements 4 and 5 and light emitting element 2 are parallel-connected to battery power supply 6, and thus voltage is applied to light emitting element 2 as well; however, light emitting element 2 does not emit light since first CMOS 37 is off (open).

Figure 11:
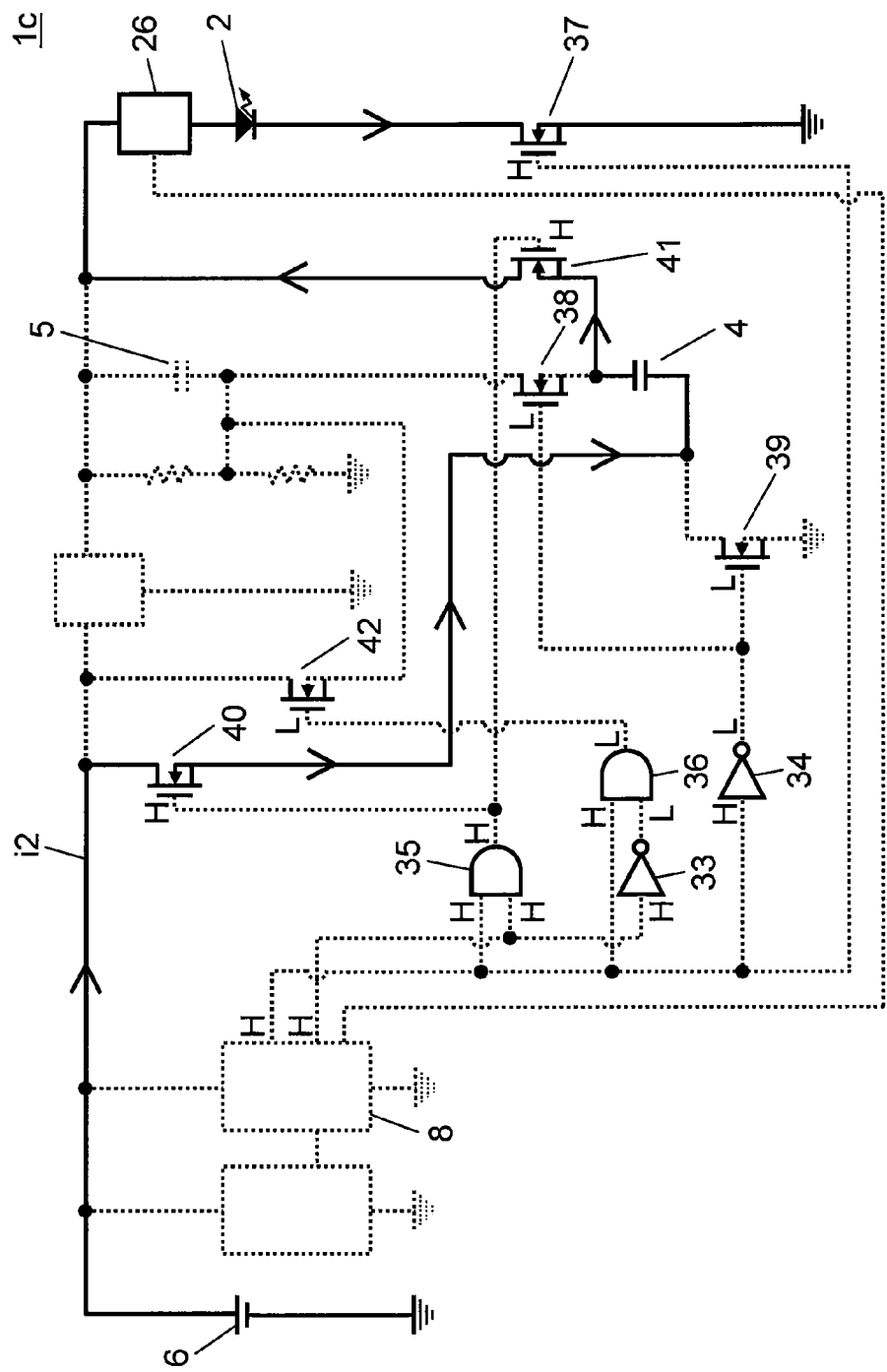
FIG. 11 is a circuit diagram of the light emitting element drive device in the first discharging state according to the third exemplary embodiment of the present invention.

Next, in the first discharging state in which light emitting element 2 emits light as auxiliary light for automatic focusing, as shown in FIG. 11, when control unit 8 outputs an H signal as a first signal, the H signal is applied to the input of the gate of first CMOS 37, which is thus turned on (close). Meanwhile, when an H signal is applied to the input of second inverter 34, an L signal is applied to the input of the gates of second and third CMOSes 38 and 39, which are thus turned off (open).

When control unit 8 outputs an H signal as a second signal, the H signal is applied to the first and second input of first AND gate 35, which thus outputs an H signal. Herewith, the H signal is applied to the input of the gates of fourth and fifth CMOSes 40 and 41, which are thus turned on (close).

Further, an H signal is applied to the first input of second AND gate 36 while the H signal is applied to the input of first inverter 33 to cause an L signal to be applied to the second input, and thus second AND gate 36 outputs an L signal. Herewith, the L signal is applied to the input of the gate of sixth CMOS 42, which is thus turned off (open).

Hence, current i2 flows from battery power supply 6 through the closed loop (shown by the heavy solid line in FIG. 11) of fourth CMOS 40, first electricity storage element 4, fifth CMOS 41, constant current circuit 26, light emitting element 2, and first CMOS 37, and thus battery power supply 6 and first electricity storage element 4 supply electric power to light emitting element 2. Accordingly, a current at a given level set to constant current circuit 26 flows through light emitting element 2, which thus light emitting element 2 emits light.

Figure 12:
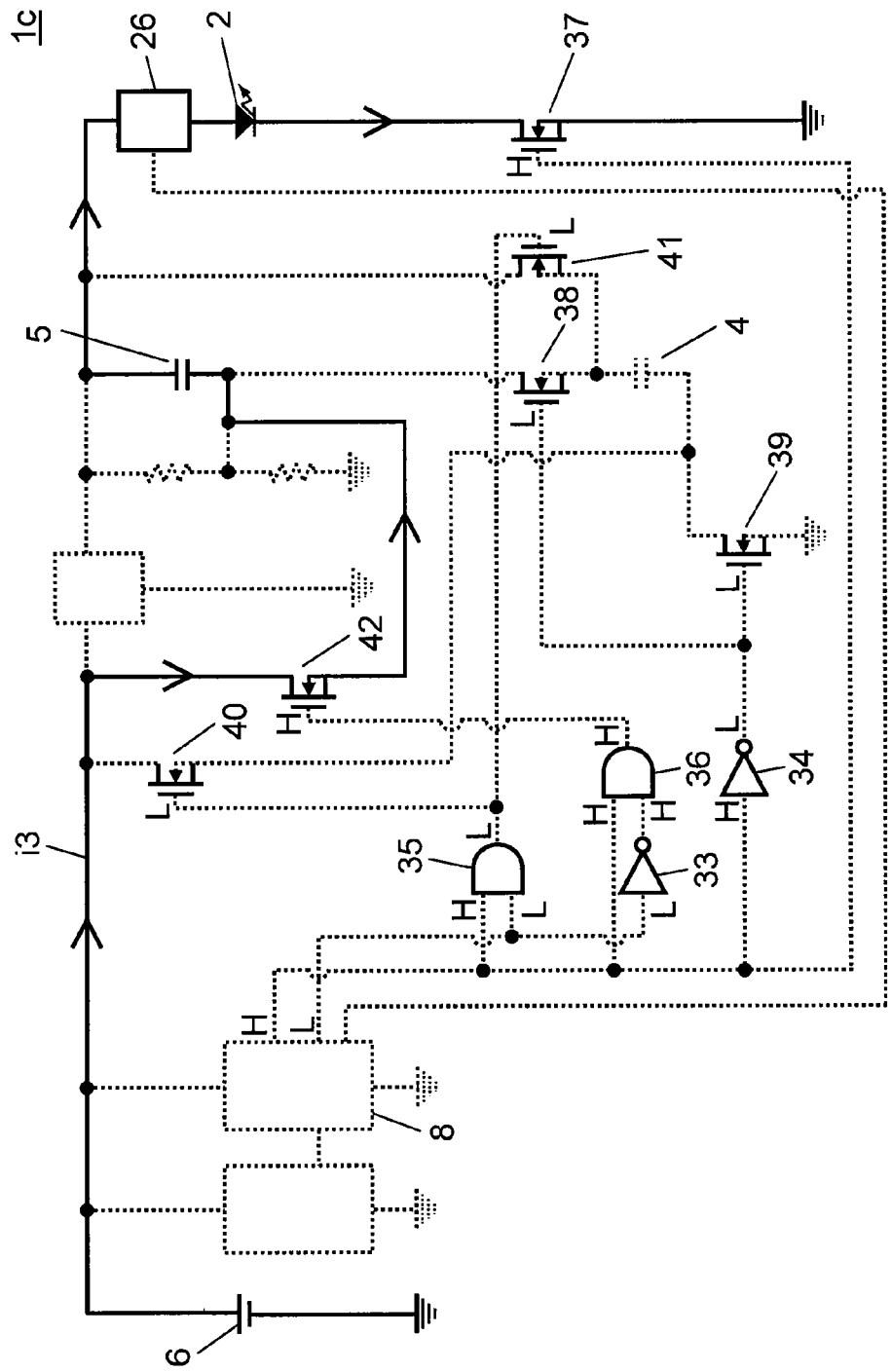
FIG. 12 is a circuit diagram of the light emitting element drive device in the second discharging state according to the third exemplary embodiment of the present invention.

Further, in the second discharging state in which light emitting element 2 emits light as flash light for imaging, as shown in FIG. 12, when control unit 8 outputs an H signal as a first signal, the H signal is applied to the input of the gate of first CMOS 37, which is thus turned on (close). Meanwhile, when an H signal is applied to the input of second inverter 34, an L signal is applied to the input of the gates of second and third CMOSes 38 and 39, which are thus turned off (open).

When control unit 8 outputs an L signal as a second signal, an H signal is applied to the first input of first AND gate 35 while an L signal is applied to the second input, and thus first AND gate 35 outputs an L signal. Herewith, the L signal is applied to the input of the gates of fourth and fifth CMOSes 40 and 41, which are thus turned off (open).

Further, an H signal is applied to the first input of second AND gate 36 while an L signal is applied to the input of first inverter 33 to cause an H signal to be applied to the second input as well, and thus second AND gate 36 outputs an H signal. Herewith, the H signal is applied to the input of the gate of sixth CMOS 42, which is thus turned on (close).

Hence, current i3 flows from battery power supply 6 through the closed loop (shown by the heavy solid line in FIG. 12) of sixth CMOS 42, second electricity storage element 5, constant current circuit 26, light emitting element 2, and first CMOS 37, and thus battery power supply 6 and second electricity storage element 5 supply electric power to light emitting element 2. Accordingly, a current at a given level set to constant current circuit 26 flows through light emitting element 2, which thus light emitting element 2 emits light.

From all of the above, with light emitting element drive device 1c and mobile apparatus 14 according to this exemplary embodiment, in the first discharging state, first electricity storage element 4 discharges to cause light emitting element 2 to emit light. Meanwhile, when switched to the second discharging state, second electricity storage element 5 discharges to cause light emitting element 2 to emit light without storing electric power in first electricity storage element 4. Hence, light emitting element 2 can be made continuously emit light to shorten time during which light emitting element 2 cannot emit light.

With light emitting element drive device 1c and mobile apparatus 14 according to this exemplary embodiment, drive unit 3 switches to the first discharging state to cause light emitting element 2 to emit light as auxiliary light for automatic focusing. After that, drive unit 3 switches to the second discharging state to cause light emitting element 2 to emit light as flash light for imaging without especially storing electric power in first electricity storage element 4.

In this way, with a conventional mobile apparatus, two electricity storage elements 4 and 5 discharge to cause light emitting element 2 to emit light as auxiliary light for automatic focusing, and then two electricity storage elements 4 and 5 need to store electric power again and to discharge to cause light emitting element 2 to emit light as flash light for imaging. On the other hand, light emitting element drive device 1c and mobile apparatus 14 according to this exemplary embodiment can be operated continuously from automatic focusing to imaging.

A light emitting element drive device and a mobile apparatus according to the present invention are not limited to the above-described exemplary embodiments, but obviously various types of modifications may be added within a scope that does not deviate from the gist of the present invention. Also obviously, configurations and manners in the above-described exemplary embodiments may be freely selected and adopted, and configurations and manners according to one exemplary embodiment may be applied to those according to the other exemplary embodiments.

INDUSTRIAL APPLICABILITY

A light emitting element drive device and a mobile apparatus according to the present invention are applicable to a mobile apparatus such as a light emitting element drive device and a mobile phone that need to shorten time during which the light emitting element cannot emit light.

REFERENCE MARKS IN THE DRAWINGS

1a, 1b, 1c, 1d, 1e Light emitting element drive device
2 Light emitting element
3 Drive unit
4 First electricity storage element (electricity storage element)
5 Second electricity storage element
6 Battery power supply
7 Camera unit
8 Control unit
9 Boost unit (boost chopper circuit)
10 Balancing resistor
11, 28 Inverter (NOT gate)
12, 29, 37 First CMOS
13, 30, 38 Second CMOS
14 Mobile apparatus (mobile phone)
15 First body
16 Hinge mechanism
17 Second body
18 Operation key unit
19 Microphone
20 Sounder
21 Speaker
22 First display
23 Second display
24 Optical system
26 Constant current circuit
27, 93 Diode
31, 39, 43 Third CMOS
32, 40 Fourth CMOS
33 First inverter (NOT gate)
34 Second inverter (NOT gate)
35 First AND gate
36 Second AND gate
41 Fifth CMOS
42 Sixth CMOS
44 Limiting resistor
45 Voltage detecting unit
81 Drive control unit
82 Chopper control unit
91 Inductor
92 Switching element

The invention claimed is:

1. A light emitting element drive device comprising:
a light emitting element;
a drive unit for driving the light emitting element;
an electricity storage element capable of storing electric power;
a battery power supply capable of supplying electric power to the electricity storage element; and
a boost chopper circuit having an inductor, for boosting voltage by opening and closing a switching element,
wherein the drive unit is switchable between:
a storing state in which electric power from the battery power supply is stored in the electricity storage element, wherein electric power from the battery power supply is prevented from being supplied to the light emitting element;
a first discharging state in which the electric power stored in the electricity storage element is supplied to the light emitting element, wherein electric power from the battery power supply is prevented from being stored in the electricity storage element; and
a second discharging state in which electric power from the battery power supply is boosted by the boost chopper circuit and is supplied to the light emitting element, wherein electric power from the battery power supply is prevented from being stored in the electricity storage element.

2. The light emitting element drive device of claim 1, wherein the drive unit in the first discharging state causes the electric power stored in the electricity storage element to be boosted by the boost chopper circuit and to be supplied to the light emitting element.

3. The light emitting element drive device of claim 2, wherein the boost chopper circuit in the first discharging state changes time of opening and closing the switching element so as to uniformize voltage applied to the light emitting element.

4. The light emitting element drive device of claim 1, wherein the drive unit further includes a current limit unit for limiting a level of a current output from the battery power supply in the storing state in which electric power from the battery power supply is stored in the electricity storage element and in the second discharging state.

5. A light emitting element drive device comprising:
a light emitting element;
a drive unit for driving the light emitting element;
first and second electricity storage elements capable of storing electric power;
a battery power supply capable of supplying electric power to the drive unit and the electricity storage elements; and
a control unit supplied by the battery power supply with electric power, for controlling the drive unit,
wherein the drive unit is switchable between:
a storing state in which the electricity storage elements and the light emitting element are parallel-connected to the battery power supply and in which electric power supplied from the battery power supply is stored in the electricity storage elements wherein electric power from the battery power supply is prevented from being supplied to the light emitting element; and
a discharging state in which the first electricity storage element and the light emitting element are series-connected to the battery power supply and in which the electric power stored in the first electricity storage element is supplied to the light emitting element while the electric power stored in the second electricity storage element is supplied to the control unit.

6. A light emitting element drive device comprising:
a light emitting element;
a drive unit for driving the light emitting element;
first and second electricity storage elements capable of storing electric power; and
a battery power supply capable of supplying electric power to the drive unit and the electricity storage elements,
wherein the drive unit is switchable between:
a storing state in which the electricity storage elements and the light emitting element are parallel-connected to the battery power supply and in which electric power supplied from the battery power supply is stored in the electricity storage elements wherein electric power from the battery power supply is prevented from being supplied to the light emitting element;
a first discharging state in which the battery power supply, the first electricity storage element and the light emitting element are series-connected and in which the electric power stored in the first electricity storage element is supplied to the light emitting element; and
a second discharging state in which the battery power supply, the second electricity storage element and the light emitting element are series-connected and in which the electric power stored in the second electricity storage element is supplied to the light emitting element.

7. A mobile apparatus including the light emitting element drive device of one of claim 1.

8. A mobile apparatus comprising:
the light emitting element drive device of claim 6;
an optical system for collecting light; and
an imaging element for receiving the light collected by the optical system,
wherein the optical system has an automatic focusing mechanism, and
wherein the drive unit switches to the first discharging state so as to cause the light emitting element to emit light as auxiliary light for automatic focusing and switches to the second discharging state so as to cause the light emitting element to emit light as flash light for imaging.

9. The light emitting element drive device of claim 2, wherein the drive unit further includes a current limit unit for limiting a level of a current output from the battery power supply in the storing state in which electric power from the battery power supply is stored in the electricity storage element and in the second discharging state.

10. The light emitting element drive device of claim 3, wherein the drive unit further includes a current limit unit for limiting a level of a current output from the battery power supply in the storing state in which electric power from the battery power supply is stored in the electricity storage element and in the second discharging state.

11. A mobile apparatus including the light emitting element drive device of claim 5.

* * * * *